United States Patent [19]

Gustincic, deceased et al.

[11] 4,282,525

[45] Aug. 4, 1981

[54] MICROWAVE LIMB SOUNDER

[76] Inventors: Jacob J. Gustincic, deceased, late of Marina Del Rey, Calif., by Ruthann Gustincic, administratrix; Robert A. Frosch, Administrator of the National Aeronautics and Space Administration, with respect to an invention of Jacob J. Gustincic, deceased

[21] Appl. No.: 78,612

[22] Filed: Sep. 24, 1979

[51] Int. Cl.³ .............................................. H04B 7/00
[52] U.S. Cl. ..................... 343/100 ME; 343/100 PE; 343/781 P
[58] Field of Search ................. 343/100 ME, 100 PE, 343/761, 781 P, 837, 840

[56] References Cited

U.S. PATENT DOCUMENTS 4,166,276  8/1979  Dragone ........................... 343/781 P

*Primary Examiner*—Theodore M. Blum

*Attorney, Agent, or Firm*—Monte F. Mott; John R. Manning; Paul F. McCaul

[57] ABSTRACT

A microwave limb sounder (MLS) to measure trace gases in the upper atmosphere by comparing spectral noise content of limb soundings with the spectral noise content of cold space utilizes an offset Cassegrain antenna system and a tiltable input mirror to alternately look out at the limb and up at cold space at an elevation angle of about 22°. The mirror can also be tilted to look at a black body calibration target. Reflection from the mirror is directed into a radiometer the head of which functions as a diplexer to combine the input radiation and a local oscillator (klystron) beam. The radiometer head is comprised of a Fabry-Perot resonator consisting of two Fabry-Perot cavities spaced a number of half wavelengths apart. Incoming radiation received on one side is reflected and rotated 90° in polarization by the resonator so that it will be reflected by an input grid into a mixer, while the klystron beam received on the other side is also reflected and rotated 90°, but not without passing some energy to be reflected by the input grid into the mixer.

17 Claims, 6 Drawing Figures

MICROWAVE LIMB SOUNDER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435, 42 USC 2457).

BACKGROUND OF THE INVENTION

This invention relates to developments in a microwave limb sounder comprised of a radiometer operating in the microwave range, typically between 100 and 200 GHz, for the study of the upper atmosphere.

A microwave limb sounder (MLS) has been under development since 1975 for the purpose of providing an instrument to measure trace gases in the upper atmosphere. Basically the instrument switches and compares the spectral noise content between noise received from a horizontal beam by looking out at the limb, i.e., looking out over the horizon, from an aircraft or spacecraft and a reference beam by looking up at cold space at an elevation angle of about 22° above the horizon. The average temperature difference between the two beams over the frequency range of interest is about 30°–40° K, so balancing noise is introduced into the reference beam to reduce this average difference. The spectral features which are superimposed on the average temperature levels are detected by a double conversion synchronous detection receiver. Because the average beam temperatures are balanced, the receiver dynamic range can be kept quite small for maximum sensitivity. The horizon signal beam is formed by an antenna, and the reference beam is formed by a sky plate. The antenna is an offset two-reflector system with a ten-inch television aperture producing an elevation beamwidth of about 0.5° and an azimuth beamwidth of 5°. The antenna subreflector is gimbaled by means of a digital servomotor and encoder, and the antenna beam is roll stabilized by means of a servo-system which receives a roll correction from an internal navigator of a spacecraft or aircraft. The sky plate is a flat reflecting mirror which directs a beam into a radiometer head from cold space at an elevation angle of 22°.

The incoming millimeter wave signal from the limb is heterodyned down to a first IF frequency centered at 1.4 GHz in the radiometer head. The 1.4 GHz IF from the radiometer head has a bandwidth of about 100 MHz and this signal is immediately amplified by a 50° parametric amplifier and several stages of low noise transistor amplifiers. The IF amplifiers are housed in a temperature stabilized IF box. The IF signals are then routed to two second heterodyning stages for two second IF conversions. One second conversion takes the IF signal down to a center frequency of about 160 MHz which is then used as an input to a 15 channel filter bank with synchronous detection. The other second conversion is used as an input to a 5 MHz fast Fourier transformer (FFT) digital correlator for fine digital resolution.

The radiometer head is a quasi-optical arrangement of grids and lenses which receives a 1½ diameter beam and focuses it into a single ended Schottky barrier diode mixer. The local oscillator energy which is provided by a klystron is frequency diplexed into the mixer diode by the radiometer head. Noise generated within the local oscillator in the signal band is filtered and absorbed by the radiometer head diplexer. Finally the radiometer head is provided with power dividers. With these dividers, the local oscillator power is divided between the diode mixer and a phase-lock mixer which is used to provide a stabilization signal to phase lock the klystron. The seventeenth or eighteenth subharmonic of a known frequency in the vicinity of the local oscillator frequency is synthesized to 0.1 MHz accuracy in an X-band frequency synthesizer. This signal is mixed with the local oscillator signal in the harmonic mixer to produce a 2 GHz IF frequency which is then used to phase lock the klystron with a commercial lock box.

A basic requirement for the MLS antenna system was to provide an extremely high efficiency antenna beam of single polarization with the highest possible vertical resolution for low-noise radiometers operating simultaneously at the five millimeter frequencies of 63, 118, 167, 184 and 230 GHz. Besides vertical resolution, the radiometer beams were required to scan slowly in elevation in a programmable manner. Provision also had to be made to provide calibration signals for the radiometers.

Approximately one meter of vertical aperture was available and it was desired that this area be used most efficiently. Ongoing receiver development will probably give rise to higher frequency radiometers in the future so that it was desirable that the MLS antenna system be adaptable to the possible utilization of these new developments as well as possible modification of the present radiometers to other adjacent frequencies.

An object of this invention was therefore to provide an antenna system that meets these basic requirements. Another object was to provide a heterodyne radiometer head to take beam energy from the antenna and energy from a local oscillator and direct them both into a mixer.

SUMMARY OF THE INVENTION

These and object objects of the invention were achieved by an offset Cassegrain antenna system having a singly curved main reflector that is parabolic in the vertical direction and linear in the horizontal direction, five doubly curved subreflectors spaced in a horizontal line, and a separate tiltable input mirror for each subreflector. Spaced for viewing with the tiltable mirrors is a sky plate in the form of a fixed mirror which reflects cold space radiation received at an elevation angle of about 22° above the horizon, and adjacent to the fixed mirror is a black-body calibration target. Attached to and behind the main reflector are a plurality of radiometer heads, one for each tiltable mirror. By tilting a mirror, input radiation to the radiometer head may be selected from the limb via a subreflector, cold space via the fixed mirror or the calibration target. The quasi-optical arrangement in the radiometer head, which functions as a diplexer of both an input beam and a local oscillator beam into a single ended Schottky barrier diode mixer, is comprised of two Fabry-Perot resonant cavities spaced a number of half wavelengths apart. Each resonator is comprised of two parallel conductive grids spaced a quarter wavelength apart. The grids of one are oriented at an angle of +·.°, and the grids of the other are oriented at an angle of −45° from the vertical. Polarized radiation passed through one is reflected by the other and repassed through the one, with 90° rotation so that as used in this invention, horizontally polarized input radiation passed through an input grid plate is reflected by the resonator, and rotated 90° back to the input grid plate where it is now reflected as vertically polarized radiation into the diode mixer. At the same time vertically polarized radiation from a local oscillator on the other side of the resonator is passed to also be reflected by the input grid plate into the diode mixer.

BRIEF DESCRIPTION OF THE DRAWINGS

While the novel features of the invention are set forth with particularity in the appended claims, the invention will best be understood from the accompanying description when read in conjunction with the following drawings.

DESCRIPTION OF PREFERRED EMBODIMENTS

Figure 1:
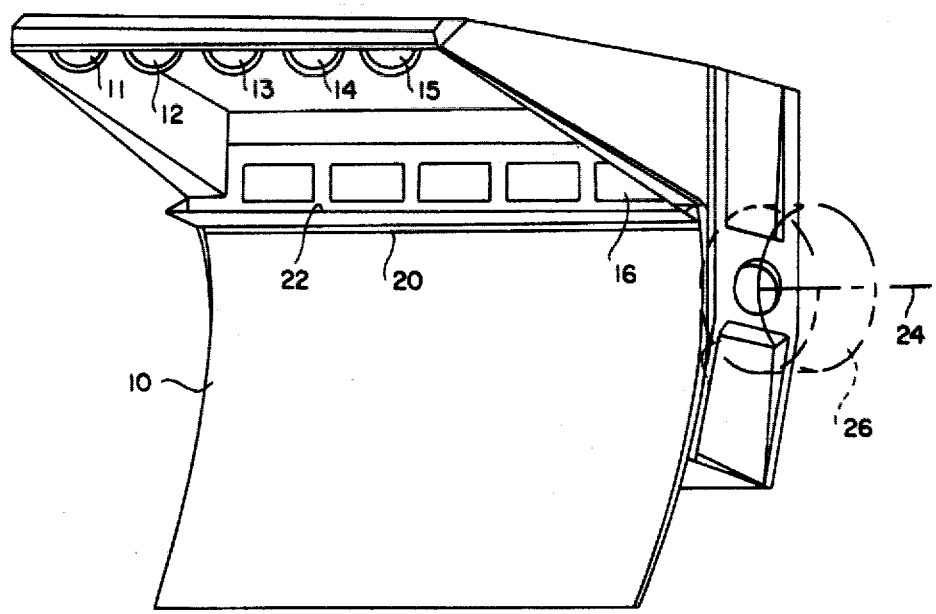
FIG. 1 is a perspective view of an antenna system for the present invention.

Referring now to the drawings, FIG. 1 shows an isometric view of the antenna system for the MLS. It is an offset-parabolic Cassegrain system comprised of a singly curved parabolic main reflector 10 fed by individual subreflectors 11 through 15, one for each of five radiometer channels. In operation, each subreflector collects energy from a portion of the main reflector via a separate tiltable input mirror, such as a mirror 16 for the subreflector 15, and directs it into a separate radiometer 18 in back of the main reflector, as more clearly shown in FIG. 2.

This configuration of a singly curved parabolic main reflector fed by a number of subreflectors provides the narrow field of view necessary for achieving the required vertical resolution. The size of the field of view, determined by diffraction, is inversely proportional to the size of the antenna. For example, a vertical dimension of 1.6 m provides ~3 km vertical resolution for ozone measurements made from a spacecraft at 600 km orbital altitude. Since the antenna beamwidth in the horizontal plane is not critical as it is in the vertical plane, the horizontal dimension of the beam can be reduced by increasing the horizontal dimension of the main reflector. This increase in dimension allows sample space to mount the five subreflectors and mirrors to effectively operate five independent antenna systems, one for each of five radiometer channels. In that way the need for multiplexing optics into a single radiometer channel is avoided.

Figure 2:
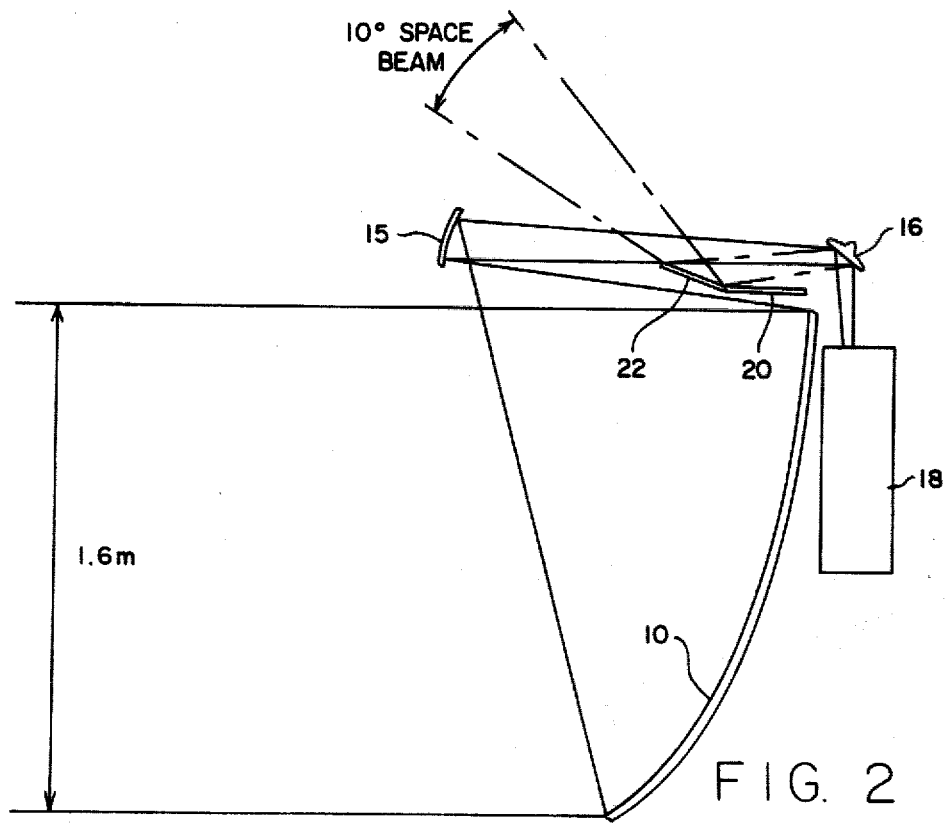
FIG. 2 is a schematic side view of the antenna system of FIG. 1.
Figures 3, 4:
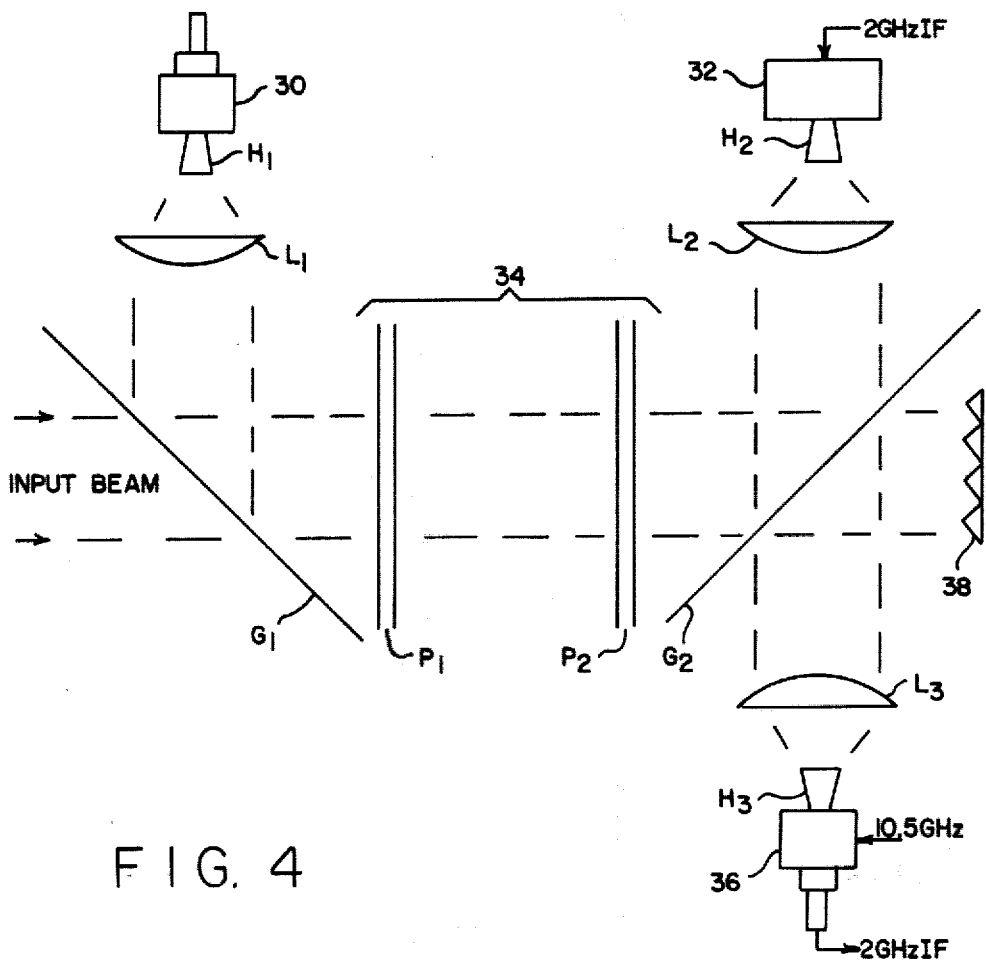
FIG. 3 is a diagram illustrating the use of the antenna system of FIG. 1 for limb sounding.
FIG. 4 is a schematic diagram of a radiometer head for the antenna system of FIG. 1.

The antenna system for each channel is used for collecting millimeter-wavelength radiation from the atmosphere limb, and from cold space, as shown schematically in FIG. 3, as well as from a calibration target 20, as can be seen in FIG. 2, by tilting the input mirror 16 to one of three positions. Switching the mirror up from the target 20 onto the subreflector 15 selects the input to the radiometer from the atmospheric limb, and switching the mirror onto an auxiliary mirror 22 at an intermediate position selects the input to the radiometer from cold space about 22° above the antenna beam. The cold space beam is confined to a viewing angle of about 10°, but that is sufficient for reliable cold space radiation measurement.

Besides vertical resolution at five millimeter frequencies, such as 63, 118, 167, 184 and 230 GHz, the radiometer beams should scan slowly in elevation in a programmable manner. The antenna provides for that by scanning in elevation by mechanically tipping the entire antenna system about an axis 24. A stepping motorgear drive 26, shown in phantom lines, would be provided for that motion. Typically, the antenna system would be scanned in programmable steps of 0.003°.

In operation, the main reflector 10 focuses energy from the limb down to a doubly curved subreflector about 0.2 mm in diameter which subtends approximately 10° at the radiometer input. The radiometer 18 is provided with appropriate optics to receive the subreflector beam with negligible spillover. By tilting the input mirror 16, the radiometer beam can be switched from the subreflector to cold space for a reference, or to the target 20 for calibration. The target is in the form of a continuous shelf, with a standard black body on its upper side developed for use at millimeter frequencies.

The target support shelf is constructed from load material, such as aluminum, with a high thermal conductivity to ensure a uniform load temperature. The load material on which the target material is itself coated is formed into teeth such that the incident energy impinges on the target material at the Brewster angle for low reflection. The load material was modified by attaching resistor heating elements and thermistor sensors to their back sides. A temperature controller is provided so that the load can be heated to approximately 80° C. and kept at a stable temperature. The temperature of the load is sensed by the thermistors, and by a temperature monitor provided to read the load temperatures for the calibration procedure.

The main reflector has a one meter vertical aperture which collimates the subreflector energy in elevation. The azimuth beamwidth of the antenna system is entirely determined by each subreflector which collimates the energy in the azimuth plane. The resulting geometry will produce a fan beam in elevation with an aspect ratio of 5:1. Assuming a cosine illumination taper of the main reflector, the calculated elevation beamwidths for the five channels are as follows:

| Radiometer (Frequency, GHz) | Beamwidth (Degrees) |
|---|---|
| 63 | 0.33 |
| 118 | 0.18 |
| 167 | 0.13 |
| 184 | 0.11 |
| 230 | 0.09 |

An episcotister or beam switch (not shown) is provided at the input of the radiometer 18 in the form of a rotating 180° section of an aluminum disc used to alternately present and withdraw a 45° inclined mirror surface to the radiometer head beam. Chopped signal noise enters the radiometer head directly from the antenna during the portion of the disc rotation cycle where the open portion of the disc passes in front of the head. The half disc is counter balanced by two conjugate brass half discs attached on either side of the aluminum disc on the same axle. The episcotister is driven by a 1500 rpm synchronous motor with a belt drive. The belt serves the purpose of coupling the motor to the episcotister axle and by a judicious choice of pully diameters, reducing the rotation rate to a nonmultiple of the 60 Hz line frequency. In an exemplary system, the episcotister has a rotation frequency of 8.33 Hz.

In the radiometer 18, a radiometer head shown in FIG. 4 accepts a signal input beam and focuses it into Schottky barrier diode mixer 30. While performing this operation, local oscillator power from a Klystron 32 is injected by the radiometer head. The head is comprised of: three lenses $L_1$, $L_2$ and $L_3$, which focus the beams indicated to small waveguide horns $H_1$, $H_2$ and $H_3$; front and back wire grid plates $G_1$ and $G_2$, which are transmissive for one polarization and reflective for the orthogonal polarization; and a polarization twisting Fabry-Perot resonator 34 which consists of two identical Fabry-Perot cavities $P_1$ and $P_2$, each of which is formed by a pair of parallel wire grids separated by a distance equal to about a quarter wavelength at the IF frequency. The cavity $P_1$ of the Fabry-Perot resonator is arranged to transmit horizontally polarized energy from left to right, and to pass energy reflected by or passed through the cavity $P_2$. The energy reflected by the cavity $P_2$ is twisted in polarization 90° to pass through the cavity $P_1$ from right to left with vertical polarization for reflection by the grid plate $G_1$ into the mixer 30. The cavity $P_2$ is oriented to pass vertically polarized energy from right to left, and horizontally polarized energy from left to right. Energy which enters the Fabry-Perot resonator from the right as vertically polarized energy is thus passed by the cavity $P_1$ and rotated 90° so it passes through the cavity $P_2$ from left to right.

The Fabry-Perot twisting polarization resonator 34 is a novel innovation central to the polarization diplexing operation performed in the radiometer head.

Operation of the radiometer head is as follows. The horizontally polarized input beam enters the head and passes without reflection through the front grid plate $G_1$ due to the vertical orientation of the grid wires. After passing through the cavity $P_1$ of the Fabry-Perot resonator 34, it is reflected back and twisted in polarization 90°. The reflected signal beam is now vertically polarized for transmission through the cavity $P_1$. The vertically polarized return signal is reflected by the front grid plate $G_1$ into the lens which focuses the energy into the Schottky barrier mixer.

The local oscillator signal generated by the klystron 32 is formed into a beam by the horn-lens combination $H_2$-$L_2$, and this beam illuminates the back grid plate $G_2$. The back grid plate is oriented to reflect the vertically polarized component of the local oscillator beam. The local oscillator beam is polarized to provide a large vertical component for the Schottky mixer 30 and a small horizontal component which passes through the back grid plate $G_2$ and is focused into a phase lock mixer 36. In the phase lock mixer, the signal is harmonically mixed with a signal near 10.5 GHz from a frequency synthesizer to provide a 2 GHz intermediate frequency which is used to phase lock the klystron.

The vertical component of the local oscillator beam, which is reflected by the back grid plate $G_2$, passes through the Fabry-Perot cavities $P_1$ and $P_2$ since both cavities are oriented for transmission of vertically polarized energy from right to left. This vertically polarized energy then strikes the front grid plate $G_1$ and is reflected into the diode mixer 30. Any horizontally polarized component generated within the klystron at the signal frequency is reflected by the Fabry-Perot resonator 34, passed through the back grid plate $G_2$, and absorbed in a load 38.

The radiometer head beams are formed by the lenses $L_1$, $L_2$ and $L_3$. Each is 0.7" thick by 1.500" diameter plano-convex teflon lens. The lens material has an ohmic loss of less than 0.1 db/in. at 115 GHz. The lens has a focal length of 0.750" so that the lens subtends an angle of 90° at the feed horn focus. The flat surface of the lens which is illuminated by the feed horn is covered with grooves to match the lens dielectric-air interface. The lens generates a far field pattern of 5° full 3 db width at 115 GHz when illuminated with a feed horn designed as described below.

The lens feed horns $H_1$, $H_2$ and $H_3$ are simple rectangular horns tapered in both E and H planes. The aspect ratio of the horn apertures is chosen to produce equal E and H plane illuminations of the lens. The feed horn design for 115 GHz is 0.500" long with an H plane aperture dimension of 0.202" and an E plane dimension of 0.140". The horn produces about a −25 db edge illumination of the lens insuring a high beam efficiency. The feed horns are machined directly into circular plates which support the mixers and klystron so that accurate alignment can be guaranteed.

Figure 5:
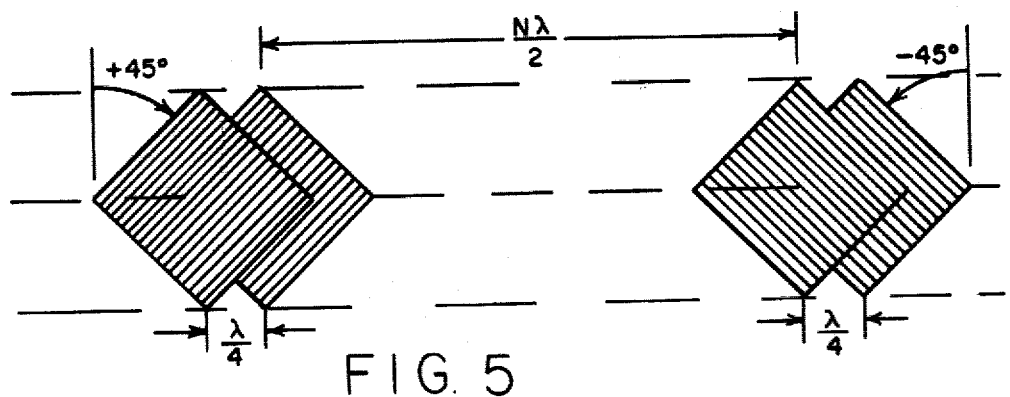
FIG. 5 illustrates schematically the construction of a Fabry-Perot resonator in the radiometer head of FIG. 4.

As noted hereinbefore, the resonator is actually two identical Fabry-Perot cavities. Each is formed by a pair of parallel wire grids separated by a distance equal to about a quarter wavelength at the IF frequency. The arrangement of the resonator is schematically illustrated in FIG. 5. Because of the wire grid construction each cavity is invisible to incident polarization perpendicular to its wires while behaving like an ordinary Fabry-Perot resonator for incident polarization parallel to its wires.

A polarization twisting Fabry-Perot resonator 34 is thus formed by taking two Fabry-Perot cavities and arranging the wires of one at an angle of +45° with respect to the incident polarization and the other with its wires at an angle of −45° with respect to the incident polarization. In addition, one cavity is spaced a number N of half wavelengths from the other so that the incident energy must travel an odd number of quarter wavelengths from the point where it impinges on the first cavity before it strikes the second cavity. Thus, when the incident energy impinges on the first cavity it breaks up into two equal components one parallel to the cavity wires and one perpendicular. The parallel component is reflected by the Fabry-Perot cavity while the perpendicular component passes through the wires unaffected and then travels an even number of quarter wavelengths where it strikes the wires of the second cavity. There this component is reflected with the same reflection coefficient as the other component reflected by the first cavity. It then travels back through the first cavity and joins the reflection from the first cavity. Because the second cavity reflection has traveled through a round trip path of an odd number of half wavelengths, it joins the first cavity reflection 180° out of phase, and thus the total returned signal from the two Fabry-Perot cavities is rotated in polarization 90° from the incident energy.

Figure 6:
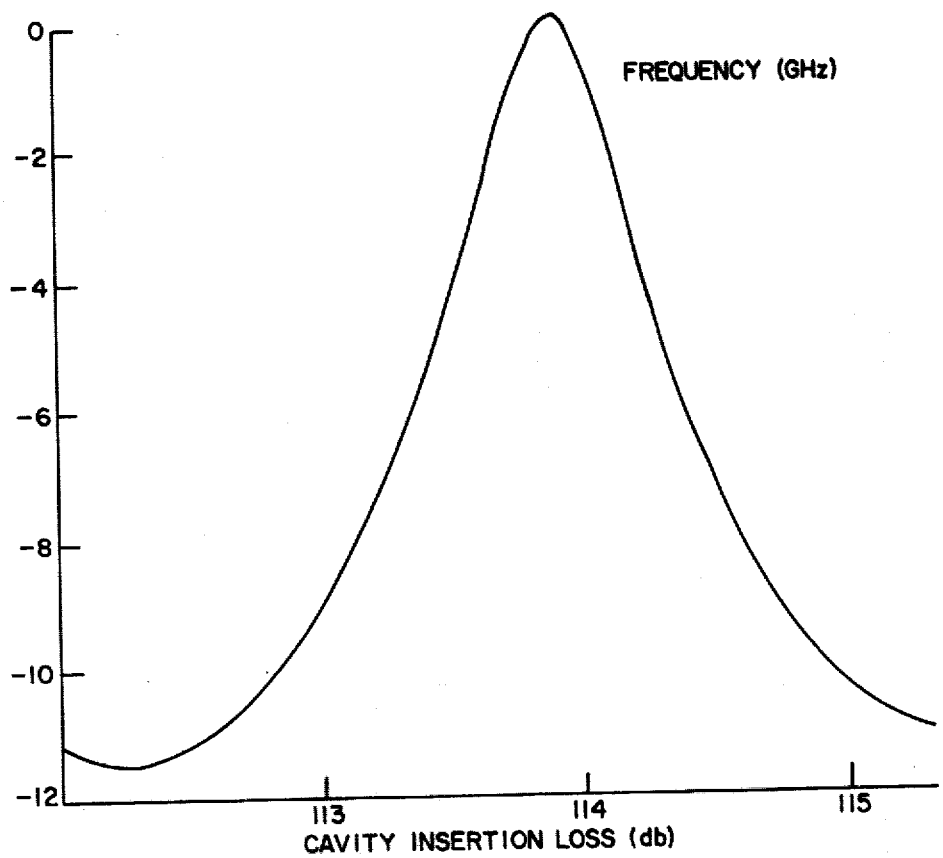
FIG. 6 illustrates computed cavity insertion loss for a typical resonator of FIG. 5.

The first cavity for the radiometer head was constructed for use at 115 GHz and was formed by photo-etching strips on a 0.032" rexolite substrate. The substrate material was selected to provide a window which was nearly invisible to the incident energy. The strips were 0.007" wide with a spacing of 0.03". This choice of strip width yielded an equivalent shunt reactance of the grid to a normally incident plane wave at 115 GHz of X=0.438. FIG. 6 shows the computed cavity insertion loss curve for this value of reactance with a grid-to-grid spacing of 1.854". The cavity in this figure is tuned to inject the local oscillator at a frequency of 113.8512 GHz with a minimum insertion loss and at the same time the local oscillator noise at the two sidebands of 11.24312 and 115.2712. The computed noise rejection for this case can be seen to be about 11 db. The actual cavity had a measured local oscillator insertion loss of between 2 and 4 db. It was determined that the effect was caused by only a partial cancelling of the waves reflected by the two halves of the cavities due to the amplitude anomalies present in the Fresnel region of the collimating lenses.

Each of the Schottky barrier diode mixers 30 and 36 utilizes a biconical diode mount described by the inventor in a paper presented at the Proceedings of the Second International Conference and Winter School on Sub-Millimeter Waves and their Applications, San Juan, Puerto Rico, Dec. 6-11, 1976, and published at pages 106-107 of the proceedings (IEEE Cat. No. 76 CH 1152-8 MTT). However, diode mixers of other designs could be used in the system. Consequently, the biconical diode mixer is not here disclosed.

Although particular embodiments of the invention have been described and illustrated herein, it is recognized that modifications and variations may readily occur to those skilled in the art. Consequently, it is intended that the claims be interpreted to cover such modifications and equivalents.

I claim:

1. In a microwave limb sounder, an antenna system and a plurality of radiometer heads, said antenna system comprising a singly curved parabolic main reflector fed by individual subreflectors disposed along a horizontal line, one subreflector for each of said radiometer heads, said radiometer heads being secured behind said main reflector, said main reflector being parabolic in the vertical direction and linear in the horizontal direction, and tiltable mirror means disposed above and behind the upper edge of the main reflector for receiving limb radiation while in a first position, whereby each subreflector which collects and focuses radiation from a portion of the main reflector directs it into a separate radiometer head, said antenna system further comprising a target plate in front of the main reflector in a position between reflected radiation from the main reflector to the subreflectors and radiation from the subreflectors to the tiltable mirror means, said target position being selected for directing radiation therefrom to said radiometer head for calibration while said tiltable mirror means is tilted down from the first position to a second position, and means for directing radiation from cold space above the horizon into said radiometer heads while said tiltable mirror means is tilted to a third position.

2. In a microwave limb sounder, the combination as defined in claim 1 wherein said tiltable mirror means is comprised of a plurality of mirrors, one for each subreflector and associated radiometer head, each mirror being separately tiltable to the three positions.

3. A microwave limb sounding antenna system as defined in claim 2 wherein means for directing radiation from cold space above the horizon into said radiometer heads is comprised of a mirror disposed horizontally for reflection into any one of said tiltable mirrors while in a third position between the first and second positions.

4. In a microwave limb sounder, the combination as defined in claim 3 wherein all elements are secured relative to each other as set forth, and including a horizontal tilt axis for said system for vertical scan of limb soundings.

5. In a microwave limb sounder, the combination as defined in claim 3 wherein each radiometer head includes a local source of radiation of predetermined frequency, and means for mixing radiation from said local source with limb sounding radiation, and means for receiving radiation from an associated one of said tiltable mirrors and said local source and directing both into said means for mixing the radiation received from a local source of radiation.

6. In a microwave limb sounder, the combination as defined in claim 4 wherein said last named means is comprised of first means in a 45° plane with respect to the direction of incoming limb sounding radiation, said means being transmissive for the horizontal polarization of said limb sounding radiation and reflective for the orthogonal polarization, and a polarization twisting means for reflecting radiation transmitted through said first means with a 90° polarization rotation into vertically polarized radiation for reflection by said first means into said mixing means, and to transmit vertically polarized components of radiation from said local source through to said first means for reflection into said mixing means.

7. In a microwave limb sounder, the combination as defined in claim 5 wherein said polarization twisting means is comprised of a pair of Fabry-Perot resonator cavities, each being formed by a pair of parallel wire grids separated by a distance equal to one pair quarter wavelength of radiation to be resonated and each being oriented from the vertical, one pair at an angle of +45°, and the other pair at an angle of −45°, said cavities being spaced apart a number of half wavelengths of radiation to be resonated.

8. A microwave limb sounding antenna system as defined in claim 7 wherein all elements are secured relative to each other as set forth, and including a horizontal tilt axis for said system for vertical scan of limb soundings.

9. A microwave limb sounder antenna system for radiometer heads in an aircraft or spacecraft comprised of a singly curved main reflector that is parabolic in the vertical direction and linear in the horizontal direction, a plurality of doubly curved subreflectors secured to and in front of said main reflector along a line substantially parallel to and above said main reflector, and a plurality of tiltable mirrors secured to and in back of said main reflector along a line substantially parallel to and above said main reflector, a separate mirror associated with each subreflector, each of said plurality of main reflectors being oriented to receive radiation reflected by said main reflector from the horizon and to direct it to a corresponding one of said mirrors, a horizontal flat plate secured to and in front of the upper edge of said main reflector in a space between the radiation beam from said main reflector to said subreflectors and from said subreflectors to said mirrors, and a flat mirror mounted along the front edge of said plate, said flat mirror being tilted to reflect a beam of radiation from cold space to said mirrors, said beam passing between said subreflectors and said tiltable mirrors, whereby said mirrors can be individually tilted to selectively direct single polarization radiation into said radiometer heads from said flat plate for calibration, from said cold space for reference and from said horizon for limb sounding, and including a horizontal tilt axis for said main reflector to scan in elevation while making limb soundings.

10. A microwave limb sounder antenna system as defined in claim 9 wherein each radiometer head includes a local source of radiation of predetermined frequency and means for mixing radiation from said local source with limb sounding radiation, and means for receiving radiation from an associated one of said tiltable mirrors and said local source and directing both into said means for mixing the radiation received from a local source of radiation.

11. The combination as defined in claim 10 wherein said last named means is comprised of first means in a 45° plane with respect to the direction of incoming limb sounding radiation, said means being transmissive for the horizontal polarization of said limb sounding radiation and reflective for the orthogonal polarization, and a polarization twisting means for reflecting radiation transmitted through said first means with a 90° polarization rotation into orthogonally polarized radiation for reflection by said first means into said mixing means, and to transmit orthogonally polarized components of radiation from said local source through to said first means for reflection into said mixing means.

12. The combination as defined in claim 11 wherein said polarization twisting means is comprised of a pair of Fabry-Perot resonator cavities, each being formed by a pair of parallel wire grids separated by a distance equal to one quarter wavelength of radiation to be resonated and each pair being oriented from the vertical, one pair at an angle of +45°, and the other pair at an angle of −45°, said cavities being spaced apart a number of half wavelengths of radiation to be resonated.

13. The combination as defined in claim 12 wherein said antenna system includes a horizontal tilt axis for said system for vertical scan of limb soundings.

14. In a microwave limb sounder, a radiometer comprising a local source of radiation of predetermined frequency and means for mixing radiation from said local source with limb sounding radiation, said means being comprised of first means in a 45° plane with respect to the direction of incoming limb sounding radiation, said means being transmissive for horizontal polarization of said limb sounding radiation and reflective for orthogonal polarization, and a polarization twisting means for reflecting radiation transmitted through said first means with a 90° polarization rotation into vertically polarized radiation for reflection by said first means into said mixing means and to transmit vertically polarized components of radiation from said local source through to said first means for reflection into said mixing means, and means for receiving radiation from an associated one of said tiltable mirrors and said local source and directing both into said means for mixing the radiation received from a local source of radiation.

15. The combination as defined in claim 7 wherein said polarization twisting means is comprised of a pair of Fabry-Perot resonator cavities, each being formed by a pair of parallel wire grids separated by a distance equal to one quarter wavelength of radiation to be resonated and each pair being oriented from the vertical, one pair at an angle of +45°, and the other pair at an angle of −45°, said cavities being spaced apart a number of half wavelengths of radiation to be resonated.

16. A microwave mixer for mixing radiation from a local source with received radiation comprised of mixing means and combining means, said combining means being comprised of first means in a 45° plane with respect to the direction of received radiation, said means being transmissive for a predetermined polarization of said received radiation and reflective for orthogonal polarization, and a polarization twisting means for reflecting radiation transmitted through said first means with a 90° polarization rotation into orthogonally polarized radiation for reflection by said first means into said mixing means, and to transmit orthogonally polarized components of radiation from said local source through to said first means for reflection into said mixing means.

17. The combination as defined in claim 16 wherein said polarization twisting means is comprised of a pair of Fabry-Perot resonator cavities, each being formed by a pair of parallel wire grids separated by a distance equal to one quarter wavelength of radiation to be resonated and each pair being oriented from the vertical, one pair at an angle of +45°, and the other pair at an angle of −45°, said cavities being spaced apart a number of half wavelengths of radiation to be resonated.

* * * * *